(12) United States Patent
Takae

(10) Patent No.: US 10,521,094 B2
(45) Date of Patent: Dec. 31, 2019

(54) DEVICE, METHOD AND COMPUTER READABLE MEDIUM THAT CHANGE A DISPLAYED IMAGE BASED ON CHANGE IN TIME INFORMATION IN RESPONSE TO SLIDE OPERATION OF THE DISPLAYED TIME

(71) Applicant: SONY CORPORATION, Tokyo (JP)

(72) Inventor: Yu Takae, Tokyo (JP)

(73) Assignee: SONY CORPORATION, Tokyo (JP)

( * ) Notice: Subject to any disclaimer, the term of this patent is extended or adjusted under 35 U.S.C. 154(b) by 577 days.

(21) Appl. No.: 14/394,415

(22) PCT Filed: Apr. 5, 2013

(86) PCT No.: PCT/JP2013/060999
§ 371 (c)(1),
(2) Date: Oct. 14, 2014

(87) PCT Pub. No.: WO2013/175891
PCT Pub. Date: Nov. 28, 2013

(65) Prior Publication Data
US 2015/0128035 A1    May 7, 2015

(30) Foreign Application Priority Data

May 21, 2012   (JP) .................................. 2012-115682

(51) Int. Cl.
*G06F 3/048* (2013.01)
*G06F 3/0484* (2013.01)
(Continued)

(52) U.S. Cl.
CPC .......... *G06F 3/04847* (2013.01); *G06F 3/016* (2013.01); *G06F 3/04845* (2013.01); *G06F 16/54* (2019.01)

(58) Field of Classification Search
CPC .. G06F 3/04847; G06F 3/016; G06F 3/04845; G06F 16/54; G06F 16/51;
(Continued)

(56) References Cited

U.S. PATENT DOCUMENTS 8,406,994 B1 * 3/2013 Pu ........................... G01C 21/26
701/408
8,947,323 B1 * 2/2015 Raffle .................... G09G 3/001
345/156

(Continued)

FOREIGN PATENT DOCUMENTS

JP   2011-150392 A   8/2011

OTHER PUBLICATIONS

International Search Report dated Jul. 24, 2013 in PCT/JP2013/060999.

(Continued)

*Primary Examiner* — Jeanette J Parker
(74) *Attorney, Agent, or Firm* — Oblon, McClelland, Maier & Neustadt, L.L.P.

(57) ABSTRACT

An information processing device includes processing circuitry that receives slide information from an operation unit regarding a slide operation performed on a displayed time that is slid across at least a portion of a display. The processing circuitry also changes a displayed image in accordance with time information associated with the slide operation of the displayed time.

13 Claims, 12 Drawing Sheets

(51) Int. Cl.
*G06F 3/01* (2006.01)
*G06F 16/54* (2019.01)

(58) Field of Classification Search
CPC ..... G06F 3/048; G06T 3/0012; H04N 9/8227; G09G 5/36
See application file for complete search history.

(56) References Cited

U.S. PATENT DOCUMENTS

| | | | | |
|---|---|---|---|---|
| 2006/0281971 A1* | 12/2006 | Sauer | ..................... | A61B 34/20 600/109 |
| 2007/0247641 A1* | 10/2007 | Okuma | ............... | G06F 3/04817 358/1.1 |
| 2009/0177998 A1* | 7/2009 | Barrios | ............... | G06F 3/04855 715/799 |
| 2010/0225667 A1* | 9/2010 | Nishiyama | ........ | G06F 17/30274 345/660 |
| 2011/0050594 A1* | 3/2011 | Kim | .................... | G06F 3/04847 345/173 |
| 2011/0191675 A1* | 8/2011 | Kauranen | ........... | G06F 3/04847 715/702 |
| 2012/0235897 A1* | 9/2012 | Hirota | ................ | H04N 1/00458 345/156 |
| 2012/0281127 A1* | 11/2012 | Marino | .............. | H04N 5/23229 348/333.01 |
| 2013/0097557 A1* | 4/2013 | Madau | ..................... | A61B 5/18 715/810 |
| 2013/0120387 A1* | 5/2013 | Mueller | .................. | G06T 15/04 345/426 |
| 2015/0160806 A1* | 6/2015 | Fey | ....................... | G06F 3/0484 715/748 |

OTHER PUBLICATIONS

"Sony Japan α CLOCK ~ α: World time captured by a" Sony, 2014, 5 Pages.

Grant Schindler, et al., "4D Cities: Analyzing, Visualizing, and Interacting with Historical Urban Photo Collections" Journal of Multimedia, vol. 7, No. 2, XP055071776, Apr. 5, 2012, pp. 124-131.

Office Action dated Aug. 4, 2017 in European Patent Application No. 13 718 657.3.

* cited by examiner

DEVICE, METHOD AND COMPUTER READABLE MEDIUM THAT CHANGE A DISPLAYED IMAGE BASED ON CHANGE IN TIME INFORMATION IN RESPONSE TO SLIDE OPERATION OF THE DISPLAYED TIME

TECHNICAL FIELD

The present disclosure relates to a user interface, an information display method, and a computer readable medium.

BACKGROUND ART

On the Internet, there are numerous websites that provide various pieces of information. These websites include websites that provide different pieces of information depending on a time period in which the user visits the websites. As an example of such websites, there is NPL 1 (non-patent literature 1) that provides wallpaper content for personal computers (PCs). This website allows the user to browse and download photographs of world heritage sites that were obtained through fixed-point image capturing performed in the same time period as a time period in which the user accesses the website. Here, fixed-point image capturing is an operation in which a subject is continuously recorded at the same place in the same screen composition at different times. Changes in a subject with time are accumulated in photographs obtained through such fixed-point image capturing.

A technique for sequentially replacing, in accordance with the current time, a displayed image including a portion that changes with time is disclosed in PTL 1 (patent literature 1), for example. In PTL 1, an image of a time displaying portion is recognized in a captured image. The position of the time displaying portion is stored. An image corresponding to the current time is sequentially selected from among a plurality of pre-stored images of the time displaying portion that displays the internal time. The selected image is displayed at the position of the time displaying portion.

CITATION LIST

Patent Literature

PTL 1: Japanese Unexamined Patent Application Publication No. 2011-150392

Non Patent Literature

NPL 1: "Sony Japan α CLOCK~α:World time captured by α (α ga kizamu sekai no toki)~", [online], Sony Corporation, retrieved on Apr. 19, 2012, <URL: http://www.sony-.co.jp/united/clock/>

SUMMARY

Technical Problem

In the above-described methods, just an image corresponding to the current time is displayed. Regarding NPL 1, in order to view photographs of other time periods, the user has to re-visit the website in different time periods or has to change the internal time of the computer each time before the user re-visits the website. Accordingly, NPL 1 fails to successively provide the user with photographs, which change with time and which were obtained through fixed-point image capturing, in accordance with a change in time. Also, regarding PTL 1, the shape of a changing portion that changes with time has to be determined in an original image, and images of the changing portion involving the time change have to be prepared in advance.

Accordingly, it is desirable to provide a user interface, an information display method, and a computer readable medium that successively provide the user with time information and information that changes in accordance with the time information in association with each other.

Solution to Problem

An information processing device includes processing circuitry that receives slide information from an operation unit regarding a slide operation performed on a displayed time that is slid across at least a portion of a display. The processing circuitry also changes a displayed image in accordance with time information associated with the slide operation of the displayed time.

According to an information processing method embodiment, the method includes receiving slide information from an operation unit regarding a slide operation performed on a displayed time that is slid across at least a portion of a display, and changing with processing circuitry a displayed image in accordance with time information associated with the slide operation of the displayed time.

According to a non-transitory computer readable medium embodiment, the medium has stored therein instructions that when executed by a processing circuitry perform an information processing method that includes receiving slide information from an operation unit regarding a slide operation performed on a displayed time that is slid across at least a portion of a display, and changing with processing circuitry a displayed image in accordance with time information associated with the slide operation of the displayed time.

Advantageous Effects of the Disclosure

According to the embodiments of the present disclosure, a user interface, an information display method, and a computer readable medium may be provided which successively provide, in response to an intuitive operation, the user with time information and information that changes in accordance with the time information in association with each other.

DESCRIPTION OF EMBODIMENT

An embodiment to be described below is a preferred specific example of the present disclosure with various technically preferred limitations. However, the scope of the present disclosure is not limited to this embodiment unless the following description states that the present disclosure is limited to this embodiment.

The following description will be given in the following order.
1. First Embodiment
2. Examples
3. Modifications 1. First Embodiment

[Configuration of Device in which User Interface is Implemented]

Figure 1:
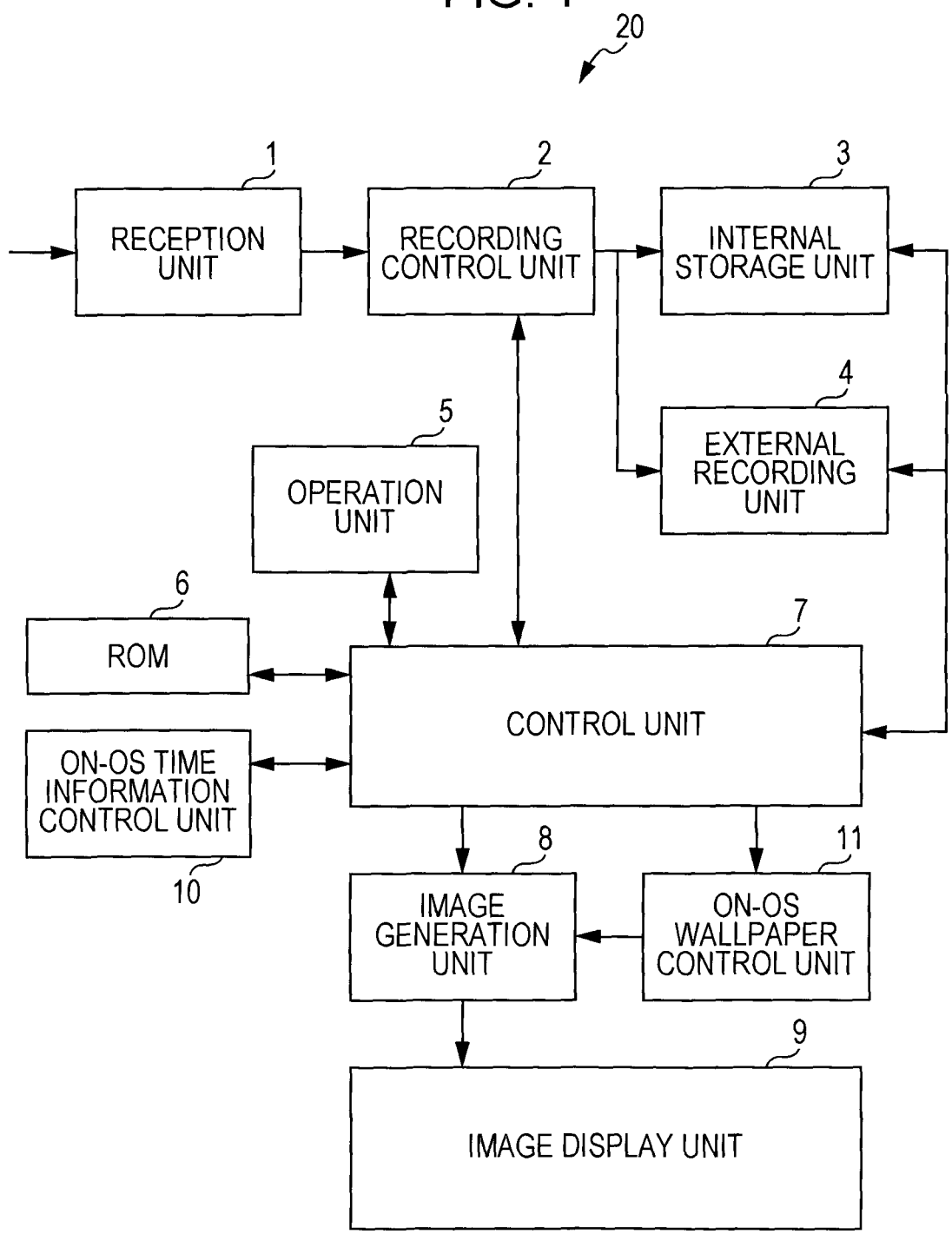
FIG. 1 is a functional block diagram illustrating a schematic configuration of a device in which a user interface according to an embodiment of the present disclosure is implemented.

Referring to the accompanying drawings, a time shifting user interface according an embodiment of the present disclosure will be described. First, a configuration of a device 20 in which a user interface according to an embodiment of the present disclosure is implemented will be described. FIG. 1 illustrates an overview of the device 20 in which the user interface according to the embodiment of the present disclosure is implemented. The device 20 includes a reception unit 1, a recording control unit 2, an internal storage unit 3, an external recording unit 4, an operation unit 5, a ROM (Read Only Memory) 6, a control unit 7, an image generation unit 8, an image display unit 9, an on-OS (Operating System) time information control unit 10, and an on-OS wallpaper control unit 11.

Examples of the device 20 include mobile information terminals and multifunction mobile information terminals having a network connection function. More specifically, examples of the device 20 include smartphones having an Internet connection function. The application range of the user interface according to the embodiment of the present disclosure is not limited to mobile information terminals or the like described above. For example, the present disclosure is applicable to clocks, digital photo frames, tablet PCs, mobile PCs, desktop PCs, televisions, digital still, cameras, and digital video cameras. Furthermore, the present disclosure is also applicable to operation user interfaces or the like of apparatuses including head-mounted displays (including those of video see-through type and of optical see-through type) and of surveillance cameras and cameras having a time-lapse image capturing function.

The reception unit 1 is connected to the Internet, for example, via a wireless base station, an exchange, and a wireless LAN (Local Area Network) access point. The reception unit 1 is, for example, a communication device that is based on a standard, such as LTE (Long Term Evolution) or IEEE (The Institute of Electrical and Electronics Engineers, Inc.) 802.11, and that performs wireless communication via the Internet. The reception unit 1 receives information, e.g., image data, which is provided via a network. The device 20 also includes a transmission unit, not illustrated.

The reception unit 1 is connected to the recording control unit 2, to which the internal storage unit 3 and the external recording unit 4 are connected. The recording control unit 2 is a device that records information received by the reception unit 1 in the internal storage unit 3 or the external recording unit 4. When the recording control unit 2 records, for example, captured image information in the internal storage unit 3 or the external recording unit 4, it records time information indicating time of image capturing together with the captured image information. Accordingly, the device 20 according to the embodiment of the present disclosure is able to acquire information provided at a site on the network, in association with the time information. Here, information is recorded in the internal storage unit 3 or the external recording unit 4 in accordance with a user instruction or the like. Alternatively, information may be recorded in the internal storage unit 3 by default and information may be recorded in the external recording unit 4 in accordance with a user instruction.

The internal storage unit 3 is a mass storage medium constituted by a hard disk, a nonvolatile memory, or the like. The internal storage unit 3 is included in a body of the device 20. As the internal storage unit 3, a flash memory, for example, is used.

The external recording unit 4 is a mass storage medium constituted by a nonvolatile memory or the like. The external recording unit 4 is removable from the body of the device 20. As the external recording unit 4, an SD memory card, for example, is used.

The operation unit 5 is an input device that generates an operation signal corresponding to a user input operation, and that outputs the operation signal to the control unit 7. As the operation unit 5, a touch panel or buttons are used. Preferably, a device employing a touch panel operation method, which serves as both a display device and a position input device, is used. A touch panel is constituted, for example, by a liquid crystal panel and a touchpad. As the touch panel, for example, a touch panel of resistive film type, of electrostatic capacitance type, of electromagnetic induction type, or of a combination thereof may be used.

On the operation unit 5, the user performs a slide (tracing) operation in a predetermined area of the touch panel. A finger of the user or a stylus (a touch pen) is used to perform the slide operation. The use of a touch panel allows the user to intuitively operate the device 20. Also, when the touch panel is used, the user easily comes up with an idea that a component arranged on a display screen is selectable or operable. Accordingly, the touch panel is particularly compatible with the time shifting user interface according to the embodiment of the present disclosure. The user interface according to embodiment of the present disclosure is operated not only through a slide operation performed on the touch panel but also by using a mouse and through a gesture, eye tracking, head tracking, eye tracking drag, etc. Alternatively, on the user interface according to the embodiment of the present disclosure, a position of time information may be operated, by using an acceleration sensor, in the vertical direction, in the horizontal direction, to the proximal side, and to the distal side in accordance with the tilt of the screen.

The ROM 6 stores the OS that runs in the device 20, an application program that implements the user interface according to the embodiment of the present disclosure, and predetermined data. A rewritable and erasable semiconductor memory is preferably used as the ROM 6. Specifically, for example, an EEPROM (Electrically Erasable Programmable Read Only Memory) or a flash memory is used as the ROM 6.

The control unit 7 includes processing circuitry, for example, a CPU (Central Processing Unit) and a RAM (Random Access Memory). The RAM is used as a work memory of the CPU. The CPU executes a program that is read from the ROM 6 and is loaded into the RAM, thereby controlling each unit of the device 20. The control unit 7 changes information and time information in accordance with a user input operation, such as a slide operation.

The image generation unit 8 includes, for example, a GPU (Graphics Processing Unit). The image generation unit 8 is included in the body of the device 20. That is, functions of the device 20 are used. The image generation unit 8 is a so-called display control unit that processes information received by the reception unit 1 or combines other information with the received information so that current time, a character, or a log type is superposed on the displayed information, thereby creating a screen to be displayed on the image display unit 9.

The image display unit 9 is a video display device, e.g., a liquid crystal display or an organic EL (Electro Luminescence) display. The image display unit 9 displays operation buttons of the device 20, information received by the reception unit 1, time information corresponding to the received information, internal time information, and so forth.

The on-OS time information control unit 10 controls the internal time of the device 20. The on-OS time information control unit 10 also adjusts the internal clock of the computer by synchronizing the internal clock with the time information on the network. In response to a request from an application program, the on-OS time information control unit 10 provides internal time information of the device 20. For example, Android (registered trademark) is used as the OS.

The on-OS wallpaper control unit 11 is, for example, a function of the OS that manages the wallpaper that is set as a background image on a home screen of the device 20. Here, the home screen indicates an initial screen that is displayed in a standby state after the device 20 is turned on before an operation is performed. The home screen is also called a standby screen. The on-OS wallpaper control unit 11 also performs processing for setting as the wallpaper an image provided from an application program. For example, a live wallpaper application program interface that implements a live wallpaper function is used as the on-OS wallpaper control unit 11.

[Display Screen of Device in which User Interface is Implemented]

Figure 2:
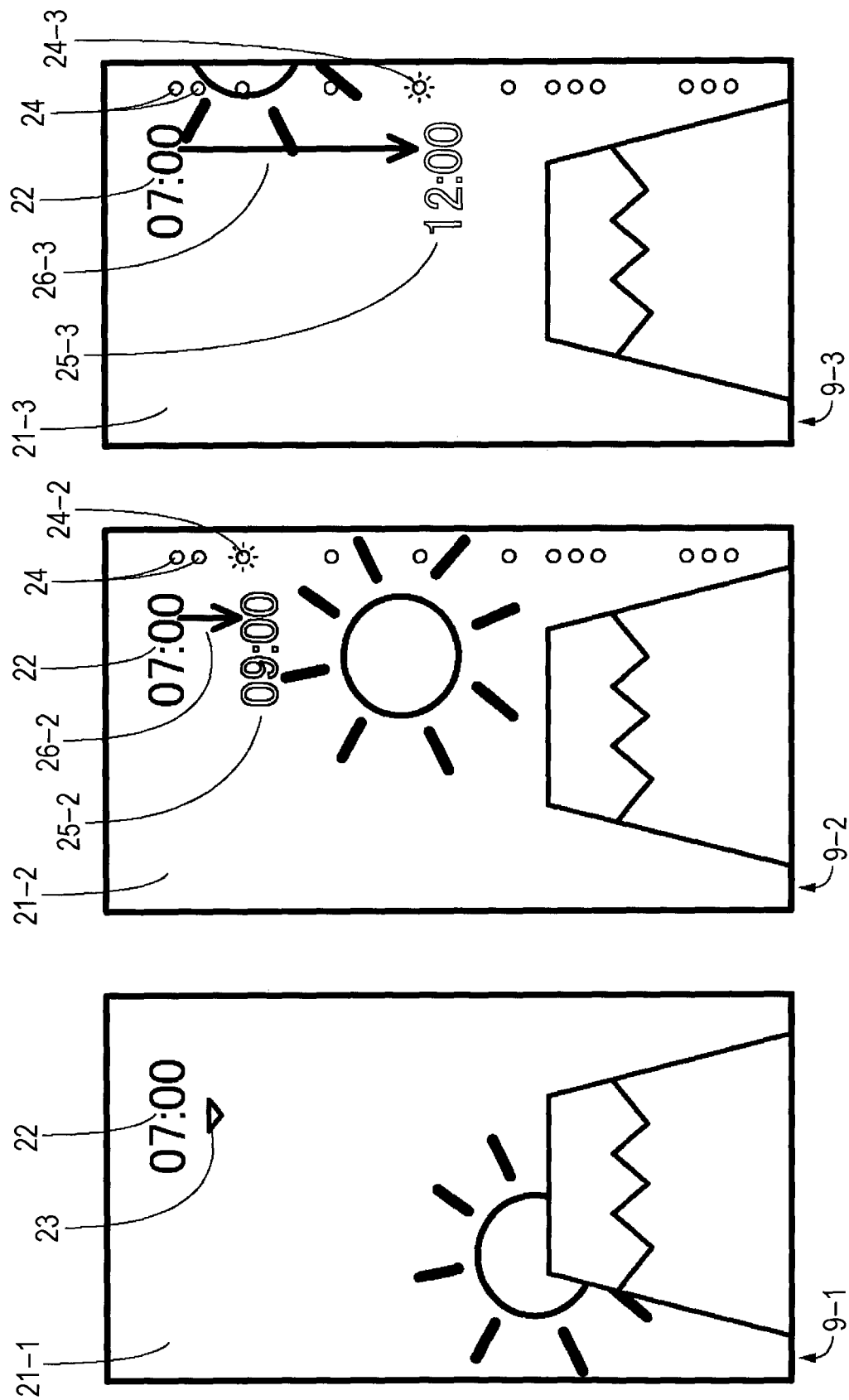
FIG. 2 is a schematic diagram illustrating a display and operation area of the device in which the user interface according to the embodiment of the present disclosure is implemented.

Next, a display screen of the device 20 in which the user interface according to the embodiment of the present disclosure is implemented will be described. FIG. 2 illustrates a display and operation area of the device 20 in which the user interface according to the embodiment of the present disclosure is implemented.

The user interface according to the embodiment of the present disclosure is provided as an application program (hereinafter, referred to as an application that is stored on a computer readable medium). Functions of the user interface according to the embodiment of the present disclosure are realized by installing the application into the device 20. For example, the application may be downloaded to the device 20 from a site, called an application store, which provides applications.

FIG. 2 schematically illustrates an initial screen displayed on an image display unit 9-1 after activation of the application. On the image display unit 9-1, a background image 21-1, current time 22, and an animation icon 23 are displayed. Image information obtained through fixed-point image capturing performed on a certain subject is preferably used as a background image 21, which is an example of information.

As the current time 22, the internal time information of the device 20 that is provided from the on-OS time information control unit 10 is displayed. For example, in FIG. 2, the current time 22 is "07:00". The current time serves as a reference of an operation that is performed on the user interface according to the embodiment of the present disclosure.

The background image 21-1 displayed on this screen is an image that was captured in a certain time period that includes the current time 22. In other words, the certain time period (e.g., 06:30 to 07:30) includes the current time 22 (e.g., 07:00) and the image capturing time (e.g., 06:50). The current time 22 and the animation icon 23 are superposed on the background image 21-1 displayed on the image display unit 9-1. The current time 22 and the animation icon 23 are displayed, for example, at an upper right portion of the background image 21-1. The animation icon 23 is located under the current time 22. The animation icon 23 is provided so as to inform the user that the current time 22 is operable. That is, the animation icon 23 allows the current time 22 to provide the user with an affordance for touching (operation) (prompt the user to touch thereon). The animation icon 23 is displayed as, for example, a downward arrow, and blinks at intervals of approximately one second.

FIG. 2 also schematically illustrates a display screen displayed on an image display unit 9-2 after a time shifting mode is started. On the image display unit 9-2, a background image 21-2, the current time 22, marks 24, and time information 25-2 are displayed. Also, a path of a slide operation 26-2 to a lower portion of the screen that is performed by the user after touching the current time 22 is schematically displayed as an arrow. After the time shifting mode is started, the animation icon 23 is hidden.

Also, FIG. 2 schematically illustrates a display screen displayed on an image display unit 9-3 after the operation proceeds. A path of a slide operation 26-3 to a further lower portion of the screen than the slide operation 26-2 is schematically displayed as an arrow.

Figure 3:
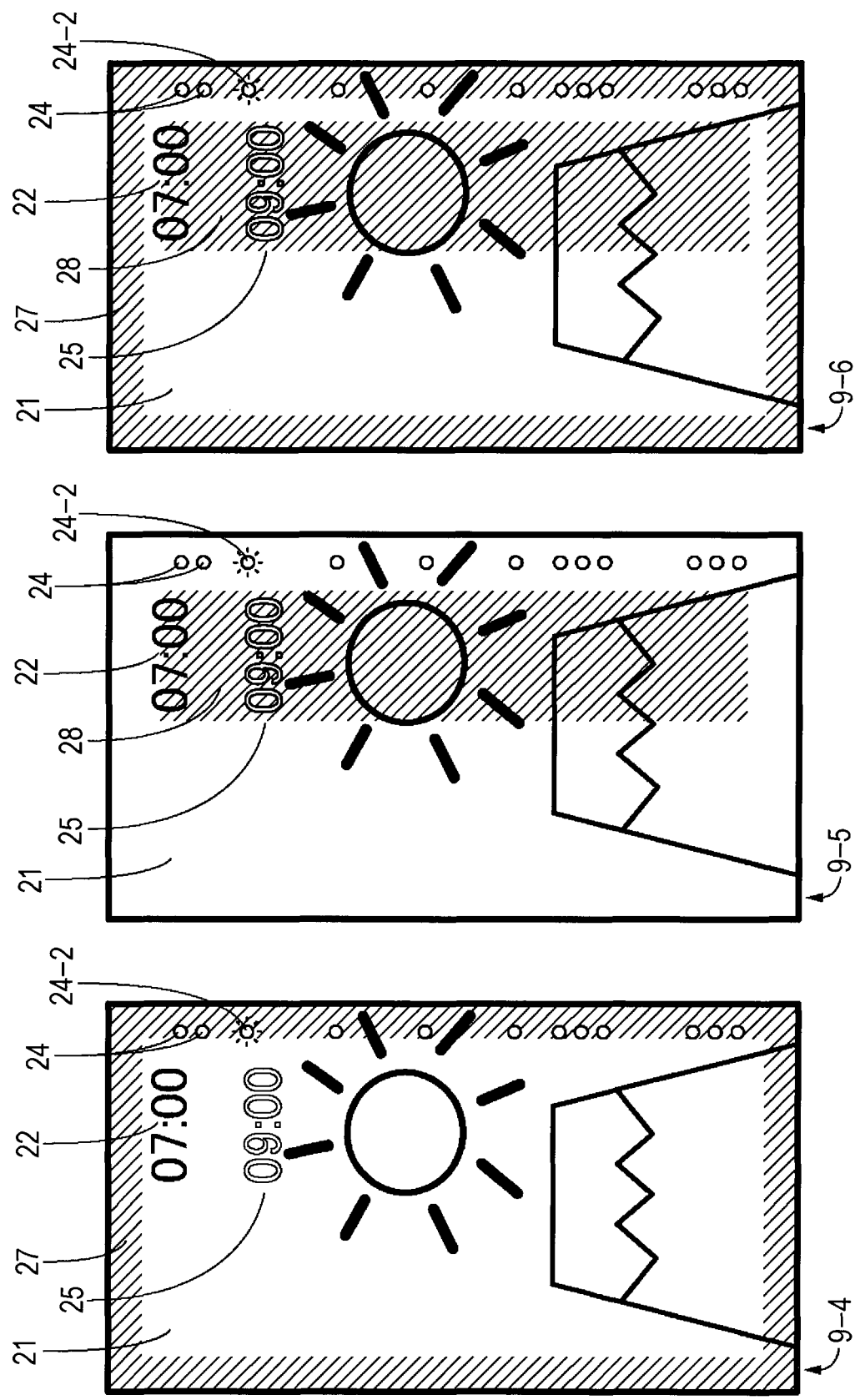
FIG. 3 is a schematic diagram illustrating screens that are displayed while the device, in which the user interface according to the embodiment of the present disclosure is implemented, is operating in a time shifting mode.

FIG. 3 illustrates screens that are displayed while the device 20, in which the user interface according to the embodiment of the present disclosure is implemented, is operating in the time shifting mode. In the time shifting mode, the display screen changes in order to inform the user that the time shifting mode has been started. Specifically, for example, as illustrated on an image display unit 9-4 of FIG. 3, a shadow 27 is placed at a periphery portion of the display screen by lowering the luminance or by correcting the tone so as to show the user that the mode has changed to the time shifting mode. Illustration of the shadow 27 is omitted on the image display units 9-2 and 9-3 of FIG. 2.

In the time shifting mode, an operation is performed on time information 25 in a certain area of the image display unit 9. The certain area in which an operation is performed on the time information 25 is referred to as an operation area (a slide operation area). In the user interface according to the embodiment of the present disclosure, the operation area is provided to have a width that is approximately ¼ to ⅓ of the horizontal width of the display screen from the right end of the display screen. The operation area of the time information 25 is an area that is superposed on the background image 21. For example, referring to FIG. 2, the time information 25-2 is superposed on the background image 21-2 within the operation area on the image display unit 9-2, whereas time information 25-3 is superposed on background image 21-3 within the operation area on the image display unit 9-3.

As illustrated in an image display unit 9-5 of FIG. 3, a shadow 28 is placed on the operation area in the time shifting mode, for example, by lowering the luminance of the background image 21 or by correcting the tone of the background image 21. The marks 24 and the time information 25 are superposed on the operation area in which the shadow 28 is placed on the background image 21. Illustration of the shadow 28 described above is omitted on the image display units 9-2 and 9-3 of FIG. 2. Although marks 24 can be associated with images, they may also be associated with other content such as items stored in a calendar. Furthermore, the control unit 7 may also keep track of an image's capture location by recording a GPS location. When the time, or location, of the device is changed to a time associated with that location, the images associated with that location are displayed.

The shadow 28 prevents the brightness or color of the time information 25 from resembling the brightness or color of the background image 21 that changes. Visibility of the time information 25 increases, and thus the time information 25 is more easily recognized by the user. During the time shifting mode, both the shadow 27 and the shadow 28 are preferably placed as illustrated in an image display unit 9-6 of FIG. 3. However, in order to allow the user to enjoy the background image 21 instead of emphasizing the time information 25, the background image 21 may be displayed without the shadows 27 and 28.

The operation area has divisions obtained by equally dividing a certain period by a certain time period. That is, the operation area is constituted by areas for a plurality of time periods into which the certain period is divided. For example, 720 divisions, which are obtained by equally dividing 12 hours by one minute, are provided. Alternatively, 24 hours may be equally divided by one minute into 1440 divisions, or one year may be equally divided by one day into 365 (or 366) divisions. The divisions for the individual time periods are consecutively arranged to form a band from the starting point to the ending point of the certain period. For example, in the image display unit 9-2 of FIG. 2, the divisions are formed such that the upper end of the operation area corresponds to the starting point and the lower end thereof corresponds to the ending point. At the upper end, the current time 22 is displayed.

In the user interface according to the embodiment of the present disclosure, the position of the current time 22 serves as the starting point. Referring to FIG. 2, in the case where an area from the upper end to the lower end represents 12 hours, the lower end represents 19:00. In the case where the area from the upper end to the lower end represents 24 hours, the lower end represents 07:00. That is, in the case where the area from the upper end to the lower end represents 24 hours, the lower end represents the time that is the same as the current time 22. For the upper end and the lower end, the same background image 21 and the same time information 25 are preferably displayed. However, in the case where the area from the upper end to the lower end represents 24 hours or the like, the time immediately before the time of the starting point may be set as the ending point, instead of setting the ending point to represent the time of, the starting point. The direction from the starting point to the ending point in FIG. 2 is merely an example. For example, the starting point and the ending point may be arranged in the opposite direction or may be arranged in the horizontal direction with different arrangement angles as long as the arrangement enables the time information 25 to be operated continuously. The operation direction is not limited to the vertical direction. For example, a movement in the horizontal direction may change the date, whereas a movement in the proximal or distal direction may change the year.

Among the divisions for the individual time periods, a division corresponding to a boundary between time periods is displayed with the mark 24, which is an icon indicating the boundary between time periods. The mark 24 allows the user to know that information corresponding to the time information 25 is prepared. An optimum number of marks 24 are selected in accordance with the number of pieces of information to be provided and dimensions of the image display unit 9. For example, in an example of FIG. 2, among the 720 divisions, twelve marks 24 are provided for points at which the background image 21 is switched. That is, in the example of FIG. 2, twelve photographs are prepared. This indicates that there are twelve points at which the background image 21 is switched as a result of a slide operation 26 performed from the upper end to the lower end of the operation area in the example of FIG. 2.

The marks 24 are arranged and displayed, for example, at the right end of the operation area. When the slide operation 26 performed by user passes a position corresponding to each mark 24, a time period of the currently displayed background image 21 is explicitly displayed by lowering the degree of transparency of the mark 24 to change color or the like. Specifically, in the example of the image display unit 9-2, when the slide operation 26-2 performed by the user passes a position corresponding to a mark 24-2, the time period of the background image 21-2 is explicitly displayed by lowering the degree of transparency of the mark 24-2. Also, in the example of the image display unit 9-3, when the slide operation 26-3 performed by the user passes a position corresponding to a mark 24-3, the time period of the background image 21-3 is explicitly displayed by lowering the degree of transparency of the mark 24-3. Furthermore, when the slide operation 26 performed by the user passes a position corresponding to each mark 24, the device 20 vibrates so as to inform the user that the background image 21 has been switched.

The time information 25 is displayed, for example, at an area under a portion where the current time 22 is displayed.

In order to distinguish the time information 25 from the current time 22, the semi-transparent time information 25 is displayed, for example. The time information 25 is displayed so as to change in units of minutes in accordance with the slide operation 26. For example, in the example of the image display unit 9-2, the time information 25-2 (09:00) is displayed which is put forward in accordance with the slide operation 26-2 to a lower portion of the screen performed by the user. Also, for example, in the example of the image display unit 9-3, the time information 25-3 (12:00) is displayed which is put further forward in accordance with the slide operation 26-3 to a further lower portion of the screen performed by the user. If the user performs the slide operation 26 toward the upper portion of the screen, for example, the time information 25-2 (09:00) is displayed which is put backward from the time information 25-3. The time that changes in accordance with the slide operation 26 ultimately returns to the current time 22.

Alternatively, the current time 22 and the time information 25 may be displayed at different spaces. In such a case, instead of superposing the current time 22 and the time information 25 on the background image 21, display areas for exclusively displaying the current time 22 and the time information 25, for example, are provided.

[Operation Performed by Device in which User Interface is Implemented]

Figure 4:
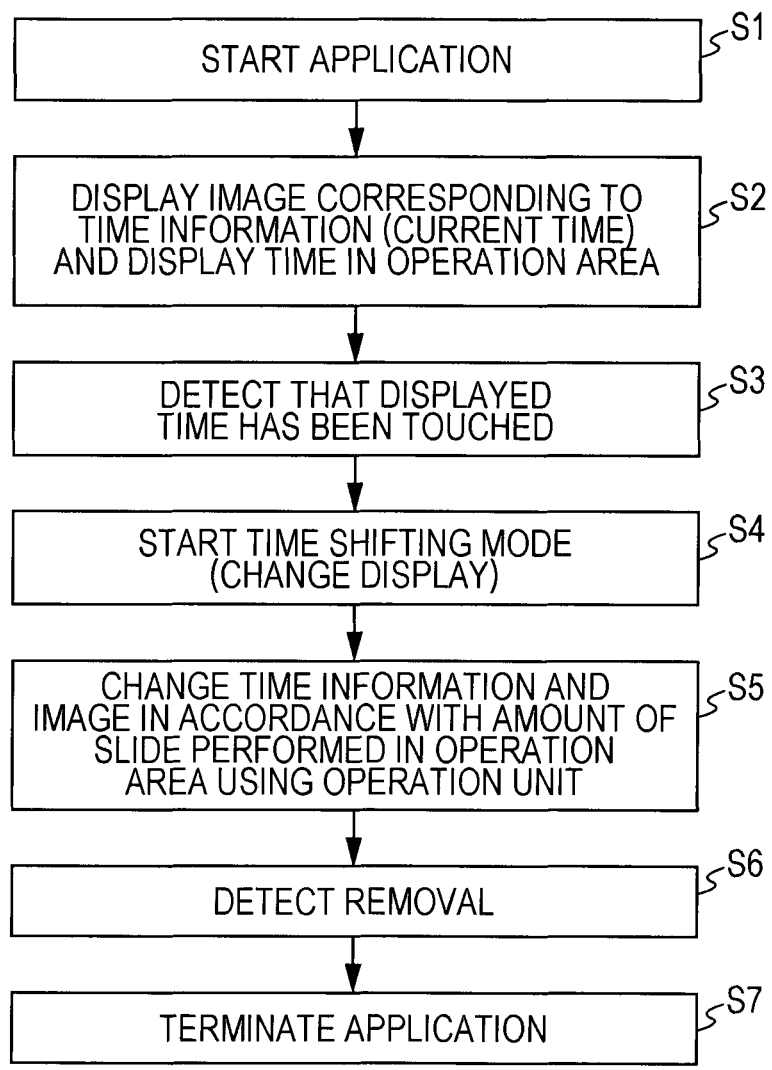
FIG. 4 is a flowchart for describing a flow of an operation performed by the device in which the user interface according to the embodiment of the present disclosure is implemented.

Next, an operation performed by the device 20, in which the user interface according to the embodiment of the present disclosure is implemented, will be described. FIG. 4 illustrates a flow of an operation performed by the device 20 in which the user interface according to the embodiment of the present disclosure is implemented.

First, an application, which serves as the user interface according to the embodiment of the present disclosure, installed in the device 20 in the above-described manner, is started (step S1). More specifically, the user taps an icon of the application displayed on the home screen, for example. In response to the tapping, the control unit 7 reads the application program that implements the user interface according to the embodiment of the present disclosure from the ROM 6 and loads the application program into the RAM, thereby starting the application.

After stating the application, the control unit 7 acquires time information (the current time 22) from the on-OS time information control unit 10, reads information (the background image 21-1) corresponding to the current time 22 from one of the internal storage unit 3 and the external recording unit 4, and displays the acquired pieces of information on the image display unit 9 (step S2). At this time, information that is provided via the network and is received by the reception unit 1 may be displayed on the image display unit 9. The current time 22 and the animation icon 23 are superposed on the operation area of the background image 21-1. The display screen in which the background image 21-1, the current time 22, and the animation icon 23 are combined together is generated by the image generation unit 8. The generated display screen is supplied to the on-OS wallpaper control unit 11 in response to a user request, and is set as a wallpaper of the home screen of the device 20. This operation may be completed within the application instead of transferring the image to an external program, such as the OS.

If no touch operation is performed on this image display unit 9, the current time 22 changes as time passes and the background image 21-1 is automatically switched to an image that was captured in a time period including the current time.

When the user touches the current time 22, the control unit 7 having received an operation signal generated by the operation unit 5 detects that the current time 22 has been touched (step S3). In the user interface according to the embodiment of the present disclosure, the user continuously touches the display portion of the current time 22 without removing their finger or the like from the display portion. However, the time shifting mode may be started in response to the user touching the display portion of the current time 22 and then removing their finger from the display portion before performing the slide operation 26, which is performed after the touch operation. In the case of PCs, the time shifting mode may be started in response to the user clicking the current time 22 before performing a drag operation by using the mouse.

In accordance with a user request, the control unit 7 starts the time shifting mode (step S4). At the same time, the control unit 7 changes the display screen in order to explicitly indicate that the current mode is the time shifting mode. Specifically, for example, the animation icon 23 is hidden and the shadow 27 is placed at the periphery portion of the display screen. Note that, in the time shifting mode, the animation icon 23 is not displayed. The control unit 7 also places the shadow 28 at the operation area, and displays the semi-transparent time information 25-2 at an area under the current time 22. At the time when display of the time information 25-2 is started, the time information 25-2 is temporarily displayed at an area above the display portion of the current time 22 and is then moved to the area below the display portion of the current time 22, for example. Displaying the time information 25-2 in such a manner explicitly informs the user that the display portion of the time information 25-2 is a component that is operable in the vertical direction. Another method may be used as long as the user is informed that the display portion of the time information 25-2 is operable.

Then, the control unit 7 displays the time information 25 so that the time information 25 follows the operation position in accordance with the amount of the slide operation 26 performed in the operation area by using the operation unit 5, and presents the background image 21, which is information corresponding to the time information 25 (step S5). Specifically, as the finger of the user who performs the slide operation 26 or the stylus is moved toward the lower portion in the operation area, the time of the time information 25 is put forward in units of minutes in accordance with the amount of movement and also the background image 21 is switched in accordance with a time period that includes the changed time. For example, the display screen is switched from one displayed on the image display unit 9-2 to one displayed on the image display unit 9-3 of FIG. 2. At this time, the shadow 28 (see FIG. 3) placed on the background image 21 makes it easier for the user to recognize the time information 25. Another piece of information, such as sound corresponding to the time information 25, may be presented. Alternatively, a plurality of pieces of information, such as the background image 21 and sound, may be presented together.

In the user interface according to the embodiment of the present disclosure, the corresponding background image 21 is displayed every time the slide operation 26 passes positions corresponding to the individual marks 24. However, instead of displaying the background image 21 every time, the background image 21 may be switched only at a position where the slide operation 26 is stopped even if there is the mark 24, which is a point at which the background image 21 is switched, on the way. This prevents occurrence of a time delay in displaying the background image 21 in the case where the device 20 has a low processing speed and in the case where the number of prepared background images 21 is large.

The mark 24, i.e., a semi-transparent icon, is displayed at a time-period changing point at the right end of the operation area, so as to explicitly show the user the point where the background image 21 is switched. The last mark 24 which the slide operation 26 has passed is displayed with a lower degree of transparency to indicate a time period of the currently displayed background image 21. For example, in FIG. 2, the mark 24-2 is displayed on the image display unit 9-2 and the mark 24-3 is displayed on the image display unit 9-3. This allows the user to distinguish the mark 24-2 or the mark 24-3 representing the time period of the currently displayed background image 21 from other marks 24.

Moreover, when the slide operation 26 passes a position corresponding to the mark 24, the body of the device 20 vibrates. The vibration of the body of the device 20 which is performed together with the change of the displayed mark 24 allows the user to clearly recognize that the background image 21 has been switched. When the slide operation 26 is stopped at a portion where no mark 24 is displayed, i.e., between the marks 24, the lastly displayed image is continuously displayed.

While the time information 25 is being operated, the current time 22 is continuously displayed at the upper right portion of the image display unit 9. The displayed current time 22 clearly indicates the position of the starting point of the operation area. Alternatively, the current time 22 may be hidden in the time shifting mode. Alternatively, the current time 22 may be displayed at a space different from the operation area in the time shifting mode. In this manner, the user is explicitly informed that the current mode is the time shifting mode.

If the user stops performing the slide operation 26 on the time information 25 in the operation area and removes their finger or stylus from the touch panel, the control unit 7 having received an operation signal generated by the operation unit 5 detects that the user's finger or the stylus has been removed from the operation area (step S6).

Upon detection, the control unit 7 terminates the application (step S7). Alternatively, even when the finger with which the slide operation is performed is removed, the control unit 7 may continuously display the background image 21 associated with the time information without determining that the slide operation has been ended, and the control unit 7 may terminate the application when the current time 22 is touched.

The user interface according to the embodiment of the present disclosure described above is effective particularly in the case where the amount of change with time in a portion of an image, which is a subject component, differs from the amount of change with time in the rest of the image. Specifically, the user interface according to the embodiment of the present disclosure described above is effective particularly to an image obtained through fixed-point image capturing in a composition including a combination of a subject that changes a little and a subject that changes largely, such as a combination of a building and sky or a combination of land and a water surface. As devices in which the user interface according to the embodiment of the present disclosure is utilized, devices are suitable which are equipped with a screen capable of displaying a portion of a subject component, the rest of the subject component, and the time information that are superposed.

The user interface according to the embodiment of the present disclosure has following eleven parts: 1) time information, 2) subject components that change in accordance with the time information, 3) a method for displaying the time information, 4) a position where the time information is displayed, 5) a method for changing the time information, 6) a method for starting changing the time information (a time shifting mode starting method), 7) a method for operating the time information, 8) loop processing between the starting point and the ending point of the time information, 9) a method for displaying the subject component during operation of the time information, 10) a method for ending operation of the time information, and 11) transfer of the subject component to an external program.

More specifically, the above parts are followings with the corresponding numerals: 1) time by hour and minute, 2) photographs resulting from fixed-point image capturing, 3) by superposition, 4) at a fixed upper right portion of a screen, 5) in the vertical direction, 6) by touching the time information, 6) by performing a slide operation on the time information, 8) enabling loop processing, 9) by performing preview display with a shadow being placed at an area where the time information is moved and a periphery portion of the screen, 10) by removing the finger from the screen to end a slide operation, 11) transfer to the live wallpaper application program interface of ANDROID (registered trademark).

Advantageous Effects of Embodiment

The user interface according to the embodiment of the present disclosure is effective particularly to a device having a small display screen. Because a ratio of an area occupied by components displayed on a display screen of a smartphone or glasstron to the entire area of the display screen is relatively large, displaying additional components used only for operation is desirably avoided as much as possible. For example, in the case of a seek bar that is used in a program for displaying a movie, the movie hidden by the displayed seek bar is not viewable. Because only the time information that changes is displayed in the user interface according to the embodiment of the present disclosure, components, such as a seek bar, are unnecessary. That is, a simple user interface without a seek bar can be created. Accordingly, the user interface according to the embodiment of the present disclosure allows the user to perform an operation on an image without hindering the user from browsing the displayed image or the like.

In the user interface according to the embodiment of the present disclosure, an application is created which includes a GUI (Graphical User Interface) in which an area that is distributed to components other than components, such as an image or movie, that the user wishes to view is minimized even while the time information is being operated. Accordingly, the user interface according to the embodiment of the present disclosure advantageously enables information that the user wishes to view to be displayed while making the maximum use of the display screen of the device even while the time information is being operated.

The user interface according to the embodiment of the present disclosure enables, in the case where there is a component that changes in accordance with the time information, the displayed time information to be selected and operated. Thus, the user interface according to embodiment of the present disclosure can advantageously successively provide the user with the changing subject component in association with the time information in response to an intuitive operation.

2. Examples

Figure 5:
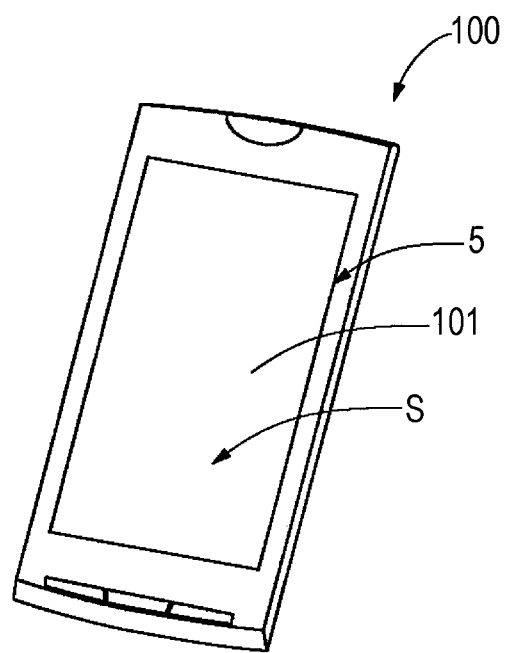
FIG. 5 is a schematic diagram illustrating an example of the device in which the user interface according to the embodiment of the present disclosure is implemented.

FIG. 5 is a schematic diagram illustrating an example of a mobile phone 100 to which the user interface according to the embodiment of the present disclosure is applied. The mobile phone 100, i.e., a so-called smartphone, includes a position input device (the operation unit 5) used to input information using a finger or stylus, and a liquid crystal panel 101 that uses an optical laminate disposed on an information input surface S. Images created based on the above-described user interface according to the embodiment of the present disclosure are displayed on the liquid crystal panel 101.

Before the images are displayed, the user interface according to the embodiment of the present disclosure, which is provided as an application program, is installed into the mobile phone 100. Then, the user starts the user interface according to the embodiment of the present disclosure.

The description will be given below by using actual display screens to which the user interface according to the embodiment of the present disclosure is applied. The display screens display images that were obtained by the user or content provider by performing fixed-point image capturing and that change with time.

FIGS. 6 to 12 illustrate images actually displayed in the mobile phone 100, which is an example of the device 20. In FIGS. 6 to 12, as an example of the displayed images, images of Mont-Saint-Michel are selected. After activation of the user interface according to the embodiment of the present disclosure, the image can be switched to another image that is prepared by the provider. For example, images are organized in the tree structure and another image is selectable by tracing the hierarchy from the upper layer to the lower layer such that "Image Selection"-"Scenery"-"World Heritage"-"Bonin Islands". These images are provided after being selected from among images obtained by performing fixed-point image capturing for a plurality of days, e.g., five days. When the images are provided, the dates on which the images were captured are ignored, and the capturing times are treated as times within one day (24 hours) and are set as pieces of time information of the images.

The images are provided as horizontally long panoramic images having, for example, an aspect ratio of 4:3. Because the screen of the mobile phone 100 has an aspect ratio of 2:3, the horizontal length of the 4:3 panoramic images is adjusted so that a certain portion is displayed. As described, the user interface according to the embodiment of the present disclosure enables the display axis to be flexibly set in accordance with the angle of view that is specific to the device.

Figure 6:
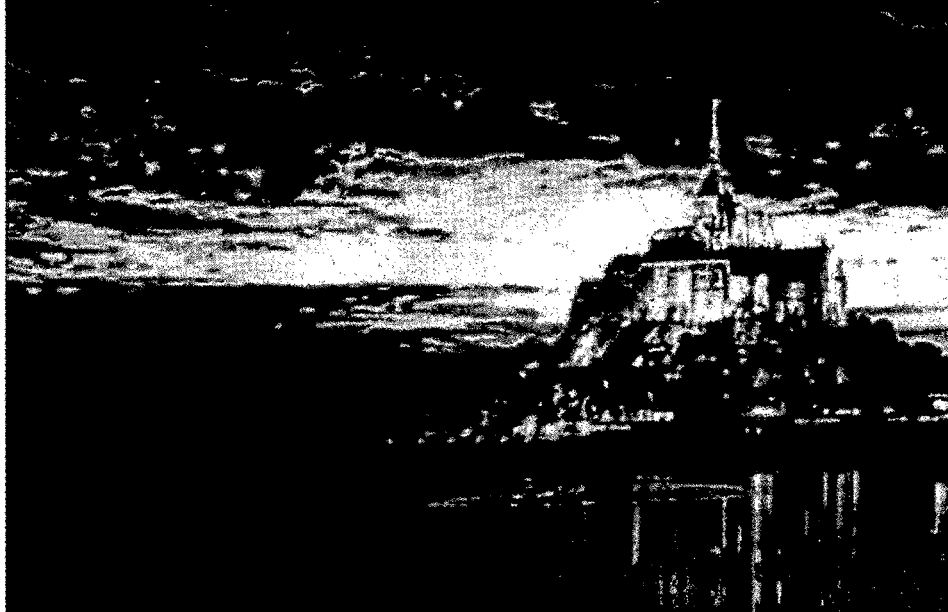
FIG. 6 is a first diagram illustrating a display screen to which the user interface according to the embodiment of the present disclosure is applied.

FIG. 6 illustrates a screen displayed after the user interface according to the embodiment of the present disclosure is activated. An image for which the display axis is set in the above-described manner is displayed on a background. At the foreground of the background image, time based on the internal time information and a downward arrow mark (providing an affordance) that blinks at certain intervals (at intervals of approximately one second) are displayed at a right corner portion and under the displayed time, respectively, so as to be superposed on the background image. This state corresponds to the state that is described referring to the image display unit 9-1 of FIG. 2 and in which the current time 22 and the animation icon 23 are displayed so as to be superposed on the background image 21-1.

FIG. 6 illustrates a state before past images that change with time are invoked in accordance with the affordance. The past images that change with time are a set of images that are extracted from among images resulting from past fixed-point image capturing and that are arranged in time order. Chronological image switching is enabled in the user interface according to the embodiment of the present disclosure. When the user touches the time displaying portion, the past images that change with time are invoked. That is, the time shifting mode is started. FIGS. 7 to 12 illustrate the states in the time shifting mode.

Figure 7:
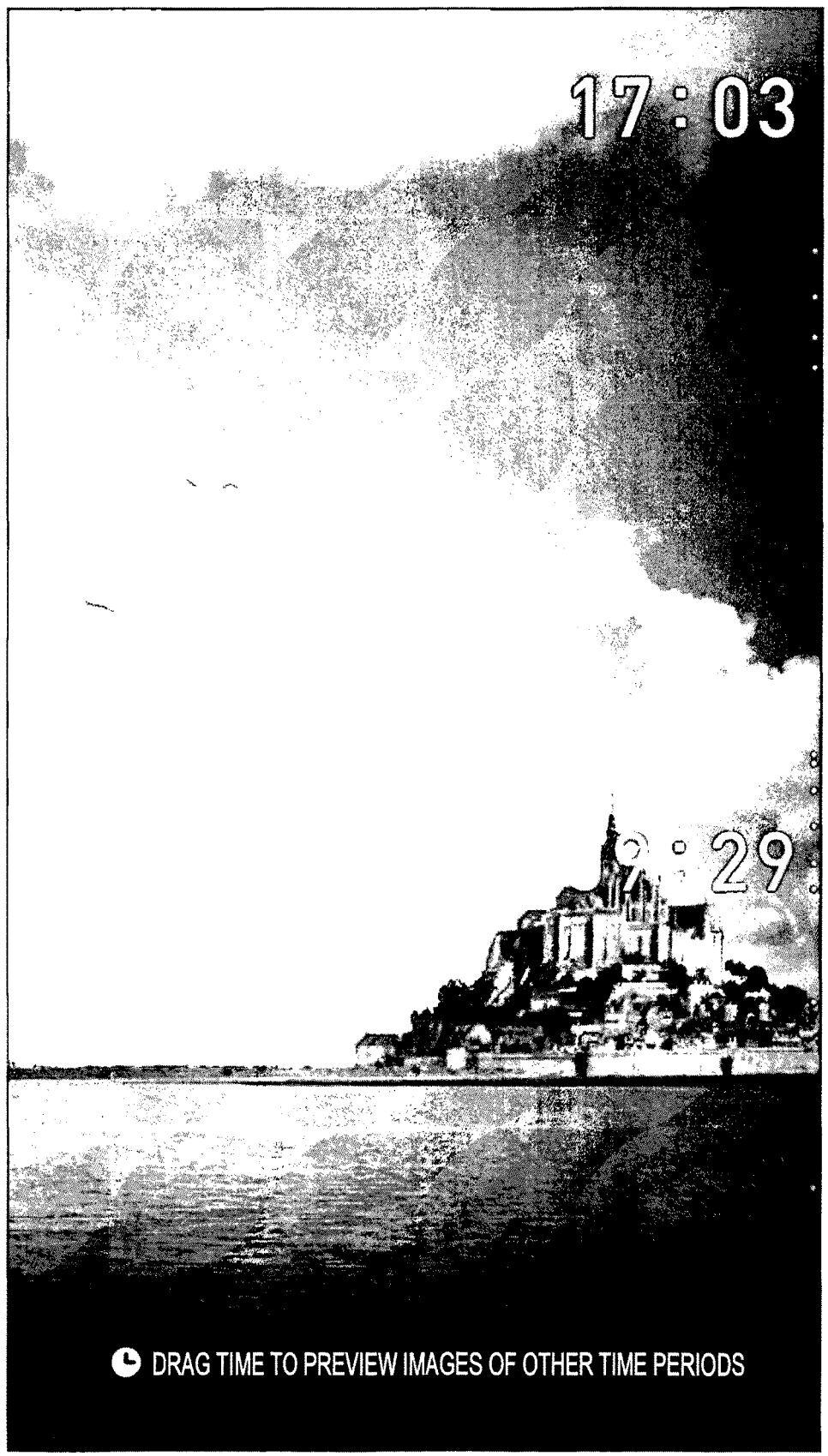
FIG. 7 is a second diagram illustrating a display screen to which the user interface according to the embodiment of the present disclosure is applied.

After information of the past images that change with time is invoked, a semi-transparent time display (09:29) and white dots indicating image switching points are displayed as illustrated in FIG. 7. This corresponds to a state in which the time information 25-2 and the marks 24 are displayed so as to be superposed on the background image 21-2 in the description of the image display unit 9-2 of FIG. 2. The image switching points are displayed as a plurality of small dots in the vertical direction at positions on the right side of the time displaying portion, which is displayed on the right side in the image that changes with time in FIG. 7.

Intervals between the image switching points are uneven. This indicates that divisions of time periods at which the image is switched are uneven. Regarding time periods of sunrise and sunset during which scenery changes within a short period of time, divisions are provided at narrow intervals. Conversely, regarding time periods of daytime and night-time during which scenery changes a little, no division is provided for a relatively long period of time. For example, at a portion near the semi-transparent time display (09:29) in FIG. 7, intervals between the image switching points are narrow. This indicates that many images are prepared which contain changes in color of the sky during a morning time period of sunrise during which the color of the sky momentarily changes.

Figure 8:
FIG. 8 is a third diagram illustrating a display screen to which the user interface according to the embodiment of the present disclosure is applied.

FIG. 7 illustrates an image, obtained through fixed-point image capturing, for a case where the time information represents "09:29". FIG. 8 illustrates an image, obtained through the fixed-point image capturing, for a case where the time information is "10:01". The images displayed as the background in FIGS. 7 and 8 are the same. This is because "09:29" and "10:01" are included in a certain range between dots indicating the image switching points and the image is not switched when the slide operation is performed at a space between "09:29" and "10:01".

Figure 9:
FIG. 9 is a fourth diagram illustrating a display screen to which the user interface according to the embodiment of the present disclosure is applied.

FIG. 9 illustrates an image, obtained through fixed-point image capturing, for a case where the time information represents "10:02". Compared with FIG. 8, only one minute has passed in FIG. 9. However, the image displayed as the background has changed by a large amount. The shapes of clouds in the sky and the shadow on Mont-Saint-Michel have changed between FIGS. 8 and 9. These changes allow the user to notice that the image has been switched. The image serving as the background is switched because the certain range between the dots indicating the image switching points is crossed when the slide operation is performed at a space between "10:01" and "10:02".

Figure 10:
FIG. 10 is a fifth diagram illustrating a display screen to which the user interface according to the embodiment of the present disclosure is applied.
Figure 11:
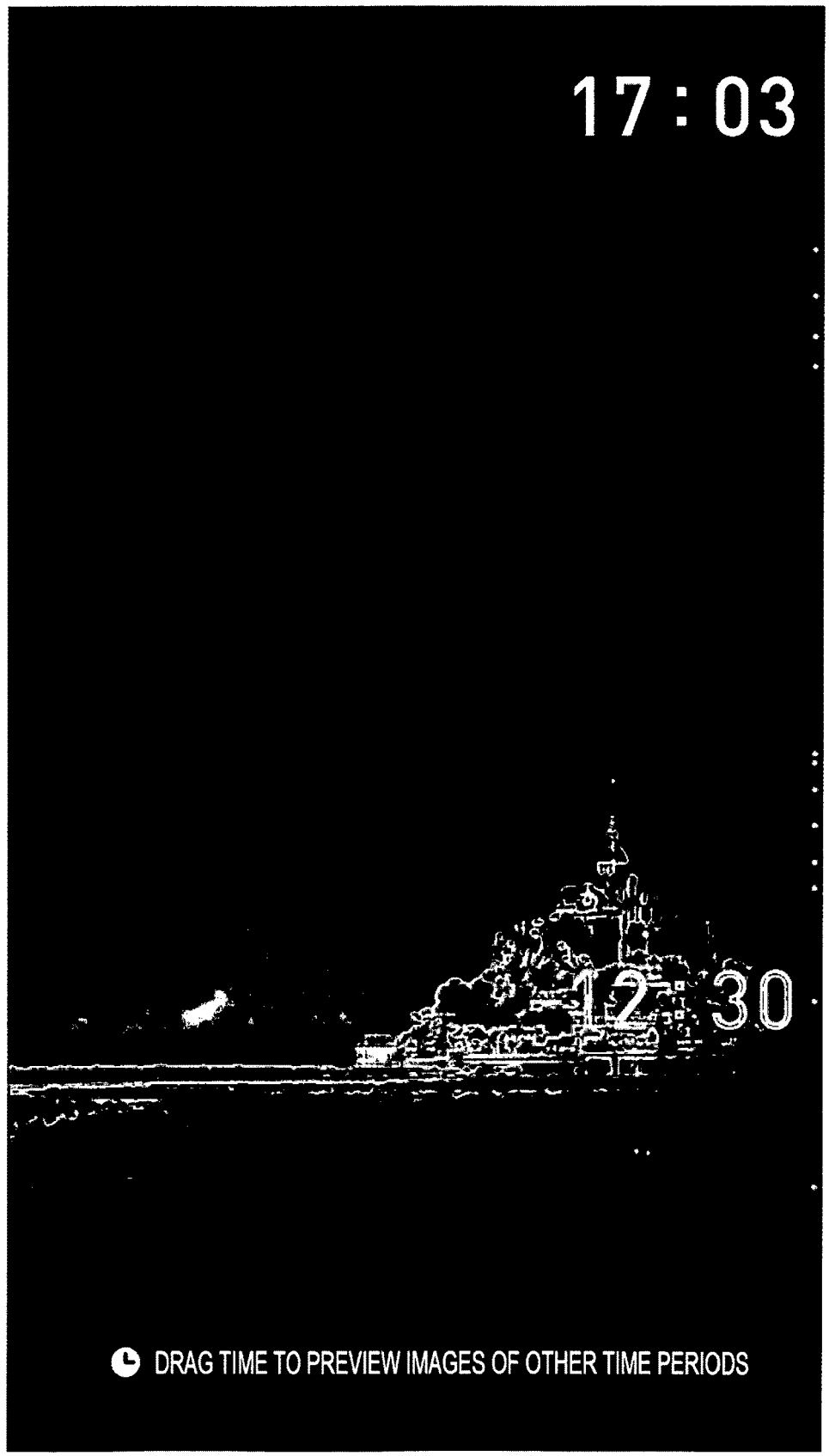
FIG. 11 is a sixth diagram illustrating a display screen to which the user interface according to the embodiment of the present disclosure is applied.
Figure 12:
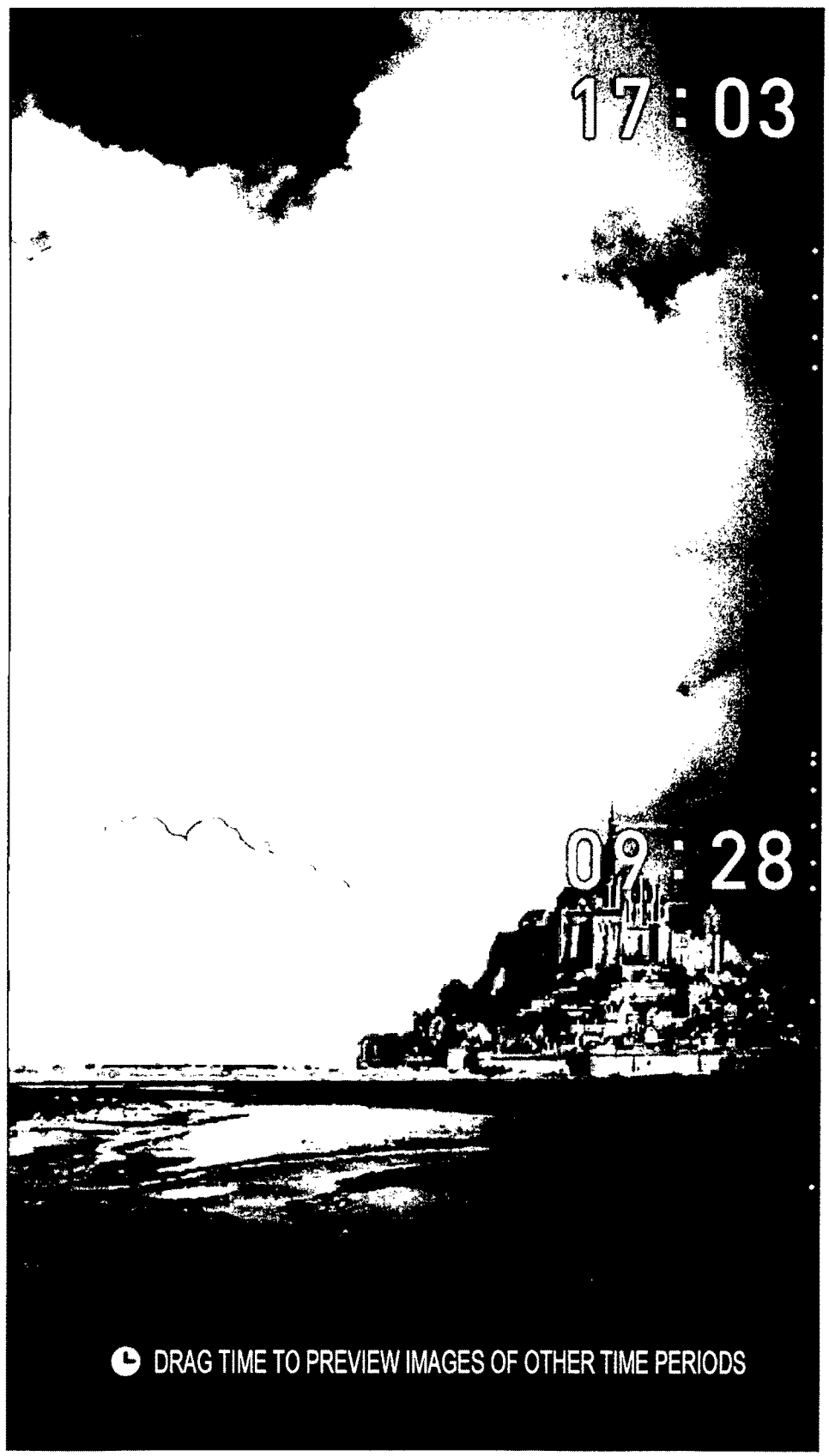
FIG. 12 is a seventh diagram illustrating a display screen to which the user interface according to the embodiment of the present disclosure is applied.

FIG. 10 illustrates an image, obtained through fixed-point image capturing, for a case where the time information represents "12:29". FIG. 11 is an image, obtained through fixed-point image capturing, for a case where the time information represents "12:30". Also, FIG. 12 is an image, obtained through fixed-point image capturing, for a case where the time information represents "09:28". The image serving as the background has changed by a large amount among FIGS. 10 to 12. This indicates that the image is switched if the slide operation is performed across a certain range between dots indicating the image switching points. When the slide operation passes the point indicating the image switching point, the mobile phone 100 vibrates so as to inform the user that the image has been switched.

When the user's finger or the stylus is removed from the information input surface S (see FIG. 5) of the liquid crystal panel 101 (see FIG. 5) after the slide operation is finished, the user interface according to the embodiment of the present disclosure is terminated.

The GUI according to the embodiment of the present disclosure allows the user to change time information through an intuitive operation in accordance with an amount of operation. The user interface according to the embodiment of the present disclosure advantageously gives enjoyment of the operation to the user and also enables photographs, which change with time and were obtained through fixed-point image capturing, to be successively and dynamically provided in accordance with the change of time.

3. Modifications

Modifications of the user interface according to the embodiment of the present disclosure will be described.

[Modification Regarding Time Information]

As information other than the time information described in the embodiment above, such as the date and the time by hour, minute, and second, information related to the time information, such as an era name, the seven days of the week, a recurring six-day series of lucky or unlucky days that is incorporated into the Japanese calendar, the first and fifteenth days of the lunar month, the age of the moon, and the tide name, may be used in the user interface according to the embodiment of the present disclosure. For example, in the case where the age of the moon is a subject component, an embodiment may be configured in which the age of the moon changes when the displayed image is moved in the direction of an orbit of the moon.

[Modification Regarding Subject Component that Changes in Accordance with Time Information]

Instead of above-described images obtained through fixed-point image capturing, information, such as video, audio, smells, and figures, may be used in the user interface according to the embodiment of the present disclosure. For example, in the case of video, video may be changed to video recorded at a morning time during a morning period and to video recorded at a night-time during a night period. For example, in the case of audio, audio may be changed to audio recorded at a morning time during a morning period and to audio recorded at a night-time during a night period. For example, in the case of smells, by using the date as the time information, the smells may be changed between a smell of seeds, a smell of leaves, a smell of flowers, and a smell of fruits. For example, in the case of figures, the user interface according to the embodiment of the present disclosure may be applied to planetariums, weather charts, railway or road operation and congestion states, maps of simulation games, etc.

[Modification Regarding Method for Displaying Subject Component During Operation of Time Information]

In the above-described embodiment, only one image is prepared as an image captured in a time period. However, a plurality of images that are captured in a time period may be prepared. For example, an image captured in a time period on a sunny day and an image captured in the time period on a rainy day may be prepared. By preparing such images for different weathers, a utilization method may be provided in which the image is displayed in accordance with weather forecast.

[Example in which "Augmented Reality Technology 'Smart AR (Trademark of Sony Corporation)'" is Used Together]

The user interface according to the embodiment of the present disclosure may be applied to "SMART AR" (trademark of Sony Corporation). First, by using "SMART AR" (trademark of Sony Corporation), the user causes a camera to recognize a specific shape pattern of a world heritage site after setting the camera toward the world heritage site and to display time information on the display of the camera so that the time information is superposed. If the user then touches and moves the time information, the camera downloads online images captured at the same angle at different times, and successively displays the images in accordance with the amount of movement.

In another example, by using "SMART AR" (trademark of Sony Corporation), if the user first sets a camera toward a restaurant signboard on which time information is written at an upper right portion, the camera recognizes the shape of the signboard and the time information and displays a menu corresponding to the time information on the display thereof. If the user then touches and operates the time information to change the time information, a menu corresponding to the time information is displayed.

[Details about Case in which Device is Changed to Head-Mounted Display]

A case is assumed here in which, at remote surgery, a doctor wearing a head-mounted display observes in real time the affected area of a patient who is at a remote place and the doctor is incapable of performing operations other than remotely operating surgery tools with their both hands.

For example, when the doctor performs surgery for which the surgery period is limited to three hours, the head-mounted display displays time information, which is 00:00, at an upper right end when the surgery starts. As time passes, the display position of the time information moves downward in accordance with the amount of change in time. The time information is set so that when one and a half hours pass, the display position moves to a position at the middle in the vertical direction, and that when three hours pass, the time information "03:00" is moved to the lower right end.

If the doctor looks at the current time for three seconds or more, the mode enters the time shifting mode in which the position of the time information changes in the vertical direction in accordance with the amount of vertical movement of the doctor's head. If the doctor moves their head upward, the time goes back to the past and past recorded images are played, which allows the doctor to easily understand a change in the affected area during the surgery. If the doctor moves their head downward, this action allows the doctor to view the current image on which a preset expected image or illustration is superposed, which allows the doctor to easily understand contents of the surgery and the difference between the progress and the plan.

Changing the position of the time information allows the doctor to intuitively understand the relative position of the current time within the entire limited time period.

In addition to the above example, the user interface according to the embodiment of the present disclosure can be used by persons who are wearing glasstrons on a crowded train, challenged persons who have disabled limbs but are able to move their eyeballs, persons who are driving vehicles, etc.

The user interface according to the embodiment of the present disclosure advantageously improves the user-friendliness in the case where the user wishes to change time information in a state in which movement of their body is limited and the user is able to move their eyeballs alone.

The present disclosure can take the following configurations.

1)

A user interface including:

a display control unit that performs control so as to display time information and information which changes in accordance with the time information;

an operation unit on which a slide operation is performed; and a control unit that performs control so as to change, in response to the slide operation, the information and the time information and so as to display the resultant information and display the resultant time information in the vicinity of a position at which the slide operation has been performed.

2)
The user interface according to 1), further including:
a reception unit that receives the information via a network, wherein the information received by the reception unit is displayed.

3)
The user interface according to 1) or 2),
wherein an area in which the slide operation is performed is an area that is displayed so as to be superposed on the information.

4)
The user interface according to any one of 1) to 3),
wherein an area in which the slide operation is performed is an area in which the information is displayed at a lower luminance.

5)
The user interface according to any one of 1) to 3),
wherein an area in which the slide operation is performed is an area in which the information is displayed in a different tone.

6)
The user interface according to any one of 1) to 5),
wherein an area in which the slide operation is performed is constituted by areas for a plurality of time periods obtained by dividing a certain period.

7)
The user interface according to 6),
wherein a mark representing each boundary between the plurality of time periods is displayed.

8)
The user interface according to 7),
wherein when the slide operation passes a position corresponding to the mark, vibration is generated.

9)
The user interface according to any one of 1) to 8),
wherein current time is displayed so as to be superposed on the information.

10)
The user interface according to any one of 1) to 9),
wherein the information is image information obtained as a result of fixed-point image capturing of a certain subject.

11)
An information display method including:
performing control, with a display control unit, so as to display time information and information which changes in accordance with the time information;
receiving, with an operation unit, a slide operation; and
performing control, with a control unit, so as to change, in response to the slide operation, the information and the time information and so as to display the resultant information and display the resultant time information in the vicinity of a position at which the slide operation has been performed.

12)
A program causing a computer to execute an information display method, the information display method including:
performing control, with a display control unit, so as to display time information and information which changes in accordance with the time information;
receiving, with an operation unit, a slide operation; and
performing control, with a control unit, so as to change, in response to the slide operation, the information and the time information and so as to display the resultant information and display the resultant time information in the vicinity of a position at which the slide operation has been performed.

The present disclosure can also take the following configurations.

An information processing device includes processing circuitry that receives slide information from an operation unit regarding a slide operation performed on a displayed time that is slid across at least a portion of a display. The processing circuitry also changes a displayed image in accordance with time information associated with the slide operation of the displayed time.

According to one aspect of the embodiment
the display is a touch display, and
the slide operation is a user-actuated operation.

According to another aspect of the embodiment,
the displayed time changes in accordance with a movement amount of the displayed time.

According to another aspect of the embodiment,
the displayed image is of an outdoor scene and the change of the displayed image is a change to another image of the outdoor scene at another time of day.

According to another aspect of the embodiment,
the another image of the outdoor scene includes a change in brightness with respect to the displayed image.

According to another aspect of the embodiment,
the change in brightness is due to an amount of sunlight in the outdoor scene.

According to another aspect of the embodiment,
the processing circuitry is further configured to include a current time in the display in addition to the displayed time.

According to another aspect of the embodiment,
the processing circuitry is further configured to cause the display to be divided into a plurality of time periods.

According to another aspect of the embodiment,
the processing circuitry is further configured to display a time period mark.

According to another aspect of the embodiment,
the processing circuitry is configured to execute a predetermined process when the displayed time is slid past the time period mark.

According to another aspect of the embodiment,
the predetermined process includes vibrating the device.

According to another aspect of the embodiment,
the slide operation is in a vertical direction, and the processing circuitry is further configured to change the displayed image according to a date or a year in response to a horizontal movement across another portion of the display.

According to another aspect of the embodiment,
the displayed image is of a geographic area and the change of the displayed image is to different weather condition for the geographic area.

According to another aspect of the embodiment, said processing circuitry is included in a head-mounted display device.

According to another aspect of the embodiment,
the processing circuitry is configured to change the displayed image to an image recorded earlier in time in response to a detected head movement of a user.

According to another aspect of the embodiment, the displayed image is an image of a surgery.

According to an information processing method embodiment, the method includes receiving slide information from an operation unit regarding a slide operation performed on a displayed time that is slid across at least a portion of a display, and changing with processing circuitry a displayed image in accordance with time information associated with the slide operation of the displayed time.

According to one aspect of the embodiment, the changing includes changing the displayed time in accordance with a movement amount of the displayed time.

According to another aspect of the embodiment, the displayed image is of an outdoor scene and the change of the displayed image is a change to another image of the outdoor scene at another time of day.

According to a non-transitory computer readable medium embodiment, the medium has stored therein instructions that when executed by a processing circuitry perform an information processing method that includes receiving slide information from an operation unit regarding a slide operation performed on a displayed time that is slid across at least a portion of a display, and changing with processing circuitry a displayed image in accordance with time information associated with the slide operation of the displayed time.

While the embodiment of the present disclosure has been specifically described above, the present disclosure is not limited to the above-described embodiment and various alterations based on the technical spirit of the present disclosure may occur. For example, the configurations, methods, processes, shapes, materials, values, etc. mentioned in the above embodiment are merely illustrative, and different configuration, methods, processes, shapes, materials, values, etc. may be used if necessary.

Also, the configurations, methods, processes, shapes, materials, values, etc. mentioned in the above embodiment may be combined with each other as long as the combinations do not depart from the gist of the present disclosure.

The present disclosure contains subject matter related to that disclosed in Japanese Priority Patent Application JP 2012-115682 filed in the Japan Patent Office on May 21, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Reception unit
2 Recording control unit
3 Internal storage unit
4 External recording unit
5 Operation unit
6 ROM
7 Control unit
8 Image generation unit
9 Image display unit
10 On-OS time information control unit
11 On-OS wallpaper control unit
20 Device
21 Background image
22 Current time
23 Animation icon
24 Mark
25 Time information
26 Slide operation (path)
27 Shadow
28 Shadow
100 Mobile phone
101 Liquid crystal panel
S Information input surface

The invention claimed is:

1. An information processing device comprising:
a display and
processing circuitry configured to:
    display a current time on the display,
    display an icon associated with the current time on the display, the icon indicating that the current time is manipulable by a slide operation, the icon being periodically blinking and superposed on a background image,
    receive a slide operation, performed on the current time displayed on the display, that is slid across at least a portion of the display; and
    in response to the slide operation performed on the current time displayed on the display,
    display a second time on the display,
    change the background image on the display from
        a first displayed image corresponding to the current time before the slide operation
        to a second displayed image corresponding to the second time wherein the second time is associated with the slide operation on the current time displayed on the display,
    display a plurality of time period marks as a plurality of second icons on the first displayed image and the second displayed image,
    each time period mark of the plurality of time period marks being one of the plurality of the second icons
    indicating a boundary between time periods,
    the plurality of time period marks including
        a first time period corresponding to the first displayed image and the current time and a second time period corresponding to the second displayed image and the second time,
    lower a degree of transparency of a second time period mark of the plurality of time period marks in response to the slide operation passing a position corresponding to the second time period mark of the plurality of time period marks, and
    vibrate in response to the background image being changed from the first displayed image to the second displayed image.

2. The information processing device of claim 1, wherein the display is a touch display, and the slide operation is a user-actuated operation, wherein
the second time is displayed in accordance with a movement amount of the slide operation on the current time.

3. The information processing device of claim 2, wherein the first displayed image is of an outdoor scene and the change from the first displayed image is a change to second displayed image of the outdoor scene at another time of day corresponding to the second time period.

4. The information processing device of claim 3, wherein the second displayed image of the outdoor scene includes a change in brightness with respect to the first displayed image.

5. The information processing device of claim 1, wherein the display is a touch display, and the slide operation is a user-actuated operation, wherein
the second time displayed changes in accordance with a movement amount of the slide operation on the second time.

6. The information processing device of claim 1, wherein the second displayed image is of an outdoor scene and the change from the second displayed image is a change to a third displayed image of the outdoor scene at another time of day corresponding to a third time.

7. The information processing device of claim 1, wherein the processing circuitry is configured to
execute a predetermined process when the second time displayed is in response to the slide operation sliding past one of the plurality of time period marks.

8. The information processing device of claim 1, wherein
the slide operation is in a vertical direction, and
the processing circuitry is further configured to
change the first displayed image according to a date or a year in response to a horizontal movement across another portion of the display.

9. The information processing device of claim 2, wherein
the first displayed image is of a geographic area and an associated weather condition, and the change from the first displayed image is to different weather condition for the geographic area.

10. An information processing method comprising:
displaying a current time on the display,
displaying an icon associated with the current time on the display, the icon indicating that the current time is manipulable by a slide operation, the icon being periodically blinking and superposed on a background image,
receiving a slide operation, performed on the current time displayed on the display, that is slid across at least a portion of the display; and
in response to the slide operation performed on the current time displayed on the display,
displaying a second time on the display,
changing the background image on the display from
a first displayed image corresponding to the current time before the slide operation
to a second displayed image corresponding to the second time wherein the second time is associated with the slide operation on the current time displayed on the display,
displaying a plurality of time period marks as a plurality of second icons on the first displayed image and the second displayed image,
each time period mark of the plurality of time period marks being one of the plurality of the second icons
indicating a boundary between time periods, (Similar to C9)
the plurality of time period marks including
a first time period corresponding to the first displayed image and the current time and a second time period corresponding to the second displayed image and the second time,
lowering a degree of transparency of a second time period mark of the plurality of time period marks in response to the slide operation passing a position corresponding to the second time period mark of the plurality of time period marks, and
vibrating in response to the background image being changed from the first displayed image to the second displayed image.

11. The information processing method of claim 10, wherein the changing includes
displaying the second time in accordance with a movement amount of the slide operation on the current time.

12. The information processing method of claim 11, wherein
the first displayed image is of an outdoor scene and the change of the displayed image is a change to the second displayed image of the outdoor scene at another time of day corresponding to the second time period.

13. A non-transitory computer readable medium having stored therein instructions that when executed by a processing circuitry perform an information processing method comprising:
displaying a current time on the display,
displaying an icon associated with the current time on the display, the icon indicating that the current time is manipulable by a slide operation, the icon being periodically blinking and superposed on a background image,
receiving a slide operation, performed on the current time displayed on the display, that is slid across at least a portion of the display; and
in response to the slide operation performed on the current time displayed on the display,
displaying a second time on the display,
changing the background image on the display from
a first displayed image corresponding to the current time before the slide operation
to a second displayed image corresponding to the second time wherein the second time is associated with the slide operation on the current time displayed on the display,
displaying a plurality of time period marks as a plurality of second icons on the first displayed image and the second displayed image,
each time period mark of the plurality of time period marks being one of the plurality of the second icons
indicating a boundary between time periods, (Similar to C9)
the plurality of time period marks including
a first time period corresponding to the first displayed image and the current time and a second time period corresponding to the second displayed image and the second time,
lowering a degree of transparency of a second time period mark of the plurality of time period marks in response to the slide operation passing a position corresponding to the second time period mark of the plurality of time period marks, and
vibrating in response to the background image being changed from the first displayed image to the second displayed image.

* * * * *